(12) United States Patent  
Langhammer (10) Patent No.: US 8,670,561 B1  
(45) Date of Patent: *Mar. 11, 2014

(54) METHOD AND APPARATUS FOR LIMITING USE OF IP

(75) Inventor: Martin Langhammer, Salisbury (GB)

(73) Assignee: Altera Corporation, San Jose, CA (US)

( * ) Notice: Subject to any disclaimer, the term of this patent is extended or adjusted under 35 U.S.C. 154(b) by 1232 days.

This patent is subject to a terminal disclaimer.

(21) Appl. No.: 11/145,458

(22) Filed: Jun. 2, 2005

(51) Int. Cl.  
*H04L 9/00* (2006.01)

(52) U.S. Cl.  
USPC .......................................................... 380/44

(58) Field of Classification Search  
USPC ............................................................ 380/44  
See application file for complete search history.

(56) References Cited

U.S. PATENT DOCUMENTS

| | | | |
|---|---|---|---|
| 4,864,161 A | 9/1989 | Norman et al. | |
| 5,121,006 A | 6/1992 | Pedersen | |
| 5,258,668 A | 11/1993 | Cliff et al. | |
| 5,274,581 A | 12/1993 | Cliff et al. | |
| 5,388,157 A * | 2/1995 | Austin | 713/191 |
| 5,550,782 A | 8/1996 | Cliff et al. | |
| 5,790,142 A | 8/1998 | Uchinami et al. | |
| 5,835,594 A * | 11/1998 | Albrecht et al. | 713/187 |
| 5,970,142 A * | 10/1999 | Erickson | 713/189 |
| 5,978,476 A | 11/1999 | Redman et al. | |
| 6,904,527 B1 * | 6/2005 | Parlour et al. | 713/189 |
| 7,107,567 B1 * | 9/2006 | LeBlanc | 716/106 |
| 7,234,159 B1 * | 6/2007 | Fox et al. | 726/9 |
| 7,685,418 B1 * | 3/2010 | Knight | 713/165 |
| 7,757,294 B1 * | 7/2010 | Simkins | 726/26 |
| 2001/0032318 A1 * | 10/2001 | Yip et al. | 713/190 |
| 2002/0024453 A1 * | 2/2002 | Maeda | 341/50 |
| 2002/0168067 A1 * | 11/2002 | Kouzminov | 380/201 |
| 2005/0071639 A1 * | 3/2005 | Rodgers et al. | 713/176 |
| 2007/0055911 A1 | 3/2007 | Boehm et al. | |
| 2008/0115026 A1 | 5/2008 | Dieffenderfer et al. | |
| 2008/0133059 A1 | 6/2008 | Trippel et al. | |
| 2010/0333184 A1 | 12/2010 | Ooi et al. | |
| 2011/0202901 A1 | 8/2011 | Givoni et al. | |
| 2012/0203482 A1 | 8/2012 | Parle et al. | |

OTHER PUBLICATIONS

U.S. Appl. No. 09/823,700, filed Mar. 30, 2001.  
U.S. Appl. No. 09/975,094, filed Oct. 10, 2001.  
U.S. Appl. No. 10/938,220, filed Sep. 10, 2004.  
U.S. Appl. No. 10/339,170, filed Jan. 7, 2003.  
U.S. Appl. No. 11/038,941, filed Jan. 19, 2005.

(Continued)

*Primary Examiner* — William Powers (57) ABSTRACT

Use of a megafunction, IP core or other IP in a configurable device is controlled by a combination of a protection circuit implemented in the configurable device with the IP and a secure device. The protection circuit includes an authorization code generator having a sequence generator and an encryption core implementing an encryption algorithm. The secure device uses an identical sequence generator and encryption core in its own authorization code generator. The sequence generators in the devices generate identical streams of values that are encrypted using the encryption algorithm. The encrypted values are compared in the protection circuit. When the streams of encrypted values are not identical, the IP and/or configurable device are prevented from operating. Where the period of the sequence generated by the sequence generators is long, the output of the encryption cores will contain that many different encrypted values, a substantial amount of highly randomized output used as authorization code for the protection of the electronic design. The run time of the IP core can be limited and/or set in various ways.

16 Claims, 6 Drawing Sheets

(56) References Cited

OTHER PUBLICATIONS

U.S. Appl. No. 12/693,223, Mechanisms and Techniques for Protecting Intellectual Property, Knight, Nathan G., filed Jan. 25, 2010, 29 pages.
Laouamri, et al., "Enhancing Testability of System on Chips Using Network Management Protocols", IEEE, 2004, 2 pgs.
Pande, et al., "High-Throughput Switch-Based Interconnect for Future SoCs", IEEE, 2003, 7 pgs.
Nathan Knight, Altera, Solving the Interface Challenges for FPGA Peripherals and Algorithm Accelerators, year 2005, 7 pgs.
Tummala, et al., "System on Chip or System on Package?", Design & Test of Computers, IEEE, vol. 16, Issue 2, Apr.-Jun. 1999, pp. 48-56.
Printed Out in Year 2008; Interface TechOnline Encyclopedia, 3 pgs.
Printed Out in Year 2008; Digital Rights Management, Wikipedia, 30 pgs.
Printed Out in Year 2008; JTAG, TechOnline Encyclopedia, 2 pgs.
Printed out in Year 2008; ScanTechnology, Tech Online Encyclopedia, 2 pgs.
TechOnline, description of Solving the Interface Challenges for FPGA Peripherals and Algorithm Accelerators, printed out in year 2008, 3 pgs.
Nios Discussion Board, General Discussion Forum, "Alan", quoting Nathan Knight of Altera, posted at May 2, 2006, 5:02 PM, 4 pgs.
U.S. Appl. No. 11/038,941, Non Final Office Action mailed Sep. 15, 2008, 11 pgs.
U.S. Appl. No. 11/038,941, Response filed Dec. 30, 2008 to Non Final Office Action mailed Sep. 15, 2008, 13 pgs.
U.S. Appl. No. 11/038,941, Notice of Allowance mailed Mar. 16, 2009, 9 pgs.
U.S. Appl. No. 11/038,941, Notice of Allowance mailed Nov. 17, 2009, 6 pgs.
U.S. Appl. No. 12/693,223, Non Final Office Action mailed Mar. 19, 2012, 11 pgs.
U.S. Appl. No. 12/693,223, Response filed Apr. 25, 2012 to Non Final Office Action mailed Mar. 19, 2012, 6 pgs.
U.S. Appl. No. 12/693,223, Non Final Office Action mailed Jul. 20, 2012, 15 pgs.
U.S. Appl. No. 12/693,223, Response filed Oct. 18, 2012 to Non Final Office Action mailed Jul. 20, 2012, 6 pgs.
U.S. Appl. No. 12/693,223, Notice of Allowance mailed Nov. 28, 2012, 15 pgs.

* cited by examiner

METHOD AND APPARATUS FOR LIMITING USE OF IP

BACKGROUND

1. Technical Field

This invention relates generally to methods, systems, machine readable media and apparatus for protecting intellectual property ("IP"). More specifically, this invention relates to techniques for limiting the use of IP in programmable logic devices and similar configurable devices.

2. Description of Related Art

Electronic design automation ("EDA") is becoming increasingly complicated and time consuming, due in part to the increasing size and complexity of the devices designed by EDA tools. The design of even the simplest of these devices typically involves generation of a high level architecture and RTL design, logic simulation, logic synthesis, timing simulation, etc. Such devices include general purpose microprocessors and custom logic devices such as programmable logic devices, application specific integrated circuit (ASIC) emulators, application specific standard product (ASSP) emulators and/or ASSP devices that possess special or optional features that can be accessed by an authorized user.

A programmable logic device ("PLD") is a programmable integrated circuit that allows the user of the circuit, using software control, to program the PLD to perform particular logic functions. A wide variety of these devices are manufactured by Altera Corporation of San Jose, Calif. When an integrated circuit manufacturer supplies a typical programmable logic device, it is not yet capable of performing any specific function. The user, in conjunction with software supplied by the manufacturer or created by the user or an affiliated source, can program the PLD to perform a particular function or functions required by the user's application. One or more of these programmed functions can be found in what is referred to commonly as a "core" within a PLD. These cores provide compartmentalized functional blocks that can be used within a programmed PLD or other logic device. Once a logic device such as a PLD is programmed with one or more of such cores, as well as any other logic as needed, the PLD can function in a larger system designed by the user just as though dedicated logic chips were employed.

One improvement in this field is the development of so-called "megafunctions" by companies such as Altera Corporation. Briefly, megafunctions are pre-designed, pre-tested, parameterized cores (or blocks of IP) which, when used, complement and augment existing design methodologies. When implementing complex system architectures, these megafunctions significantly enhance the design process. By using megafunctions, designers can focus more time and energy on improving and differentiating their system-level product, rather than re-designing frequently used functions.

As mentioned above, megafunctions are pre-designed, pre-verified parameterized implementations of system-level functions which reduce the customer's design task to creating the custom logic surrounding such commonly used system-level functions, dramatically shortening the design cycle by leveraging such existing intellectual property ("IP"), which can include proprietary apparatus, structures, techniques and methods applicable to the design field. Typically, an IP owner provides all of the files necessary to design with the megafunctions. Current practice allows designers to instantiate, compile and simulate a function to verify its operation, size and performance; however, programming files and other output files for implementing the design in hardware can be generated only with an authorization code provided when the megafunction is licensed.

A typical design cycle (using, for example, Altera's Open-Core technology) begins with a designer creating an initial block diagram and subsequently identifying any megafunctions available for use in the anticipated system. The designer then can identify and evaluate one or more specific megafunctions in terms of functionality and the range of parameterization available. After finding the appropriate megafunction(s), the designer installs the megafunction(s), completes the design and, using software, synthesizes and simulates the functionality and performance and estimates the hardware resources in the PLD required to implement the function within the anticipated circuitry and system.

However, software simulations of complex systems that incorporate IP frequently are limited in a number of respects. For example, due to the relatively slow speed of some software simulations, only a limited number of states might be testable by such software simulation. Because a hardware platform may run at much higher speeds than software simulations, a designer may need and/or want to test the design on a hardware platform as well.

In such applications, in order to fully validate and complete the system's design, the system frequently operates on a hardware prototype platform for a longer period of time than is practical for software simulation. After software simulation and synthesis, the IP owner authorizes the customer (via a license or other authorization logic) to generate programming data, such as a programming object file (a "POF" file) or an SRAM object file (a "SOF" file) of the design containing the IP, and to establish the hardware prototype. A hardware prototype platform is substantially identical to the production version of the hardware a designer intends to create. The hardware prototype can be a PLD or other device, or a system or subsystem of the total design to be created. As will be appreciated by those of ordinary skill in the art, the particulars of a hardware prototype are dependent upon the needs and circumstances of the project being undertaken by a designer and will vary widely. In the context of this disclosure, the term "hardware prototype" will mean any hardware platform suitable for evaluating and/or testing the hardware and available software for the system being designed. This hardware prototype also may be referred to herein as the "evaluation version" of a core, design or programmed device. The term "production hardware" means the desired final configuration of any hardware that the designer intends to achieve. Once this hardware prototype validation is completed, the customer can obtain from the IP owner production use authorization (such as a license), after which the IP used can be incorporated into specific devices and be put into production use.

Many IP owners have had to rely on legal contracts and/or other means to limit and control use of their IP on hardware platforms during prototype evaluation and during production use. Customers have been able to generate a file that could be used both for prototype evaluation as well as in production. Unauthorized use in production deprives the IP owner of compensation for use of its IP and inhibits the owner's control of its property. Attempts at technical measures to prevent unauthorized use of IP also have been only modestly effective.

One other solution to these problems is available using a technique that is the subject of U.S. patent application Ser. No. 09/823,700, entitled METHOD AND APPARATUS FOR PROVIDING A PROTECTED INTELLECTUAL PROPERTY HARDWARE, filed Mar. 30, 2001, assigned to Altera Corp., and is incorporated herein by reference in its entirety for all purposes. One or more aspects of the embodiments discussed in the above-cited application are incorporated in Altera's OpenCore Plus feature that is described in Altera Corporation's Application Note 176. Another solution to these problems is available using a technique that is the subject of U.S. patent application Ser. No. 10/339,170, entitled METHOD AND APPARATUS FOR CONTROLLING EVALUATION OF PROTECTED INTELLECTUAL PROPERTY IN HARDWARE, filed Jan. 7, 2003, assigned to Altera Corp., and is also incorporated herein by reference in its entirety for all purposes. In the systems discussed in the above-cited applications, various techniques enable potential users of PLDs to evaluate proprietary IP in hardware and thus permit improved development of digital systems and devices by designers while protecting the interests of the owners of the intellectual property incorporated in such systems and devices. More specifically, that system provides to an end customer IP hardware which is suitable for prototype evaluation, but unusable for production purposes.

Techniques that permit full use of IP cores and the like while protecting the proprietary interests of the owners of the intellectual property incorporated in such designs, systems and devices would represent a significant advancement in the art. Moreover, techniques that allow the IP owner to limit the number of instances of a given IP core available to unlicensed users would represent a significant advancement in the art.

BRIEF SUMMARY

Use of a megafunction, IP core or other IP in a configurable device is controlled by a combination of a protection circuit implemented in the configurable device with the IP and a secure device. The protection circuit implemented in the configurable device includes an authorization code generator having a sequence generator and an encryption core implementing an encryption algorithm. The secure device uses an identical sequence generator and encryption core in its own authorization code generator. The sequence generators in the configurable device and secure device generate identical streams of values that are encrypted using the encryption algorithm. The encrypted values are compared by a comparator in the configurable device protection circuit. When the streams of encrypted values are not identical (for example, when they cease to continue being identical), the IP and/or configurable device are prevented from operating. Where the period of the sequence generated by the sequence generators is long, such as $2^{64}$, the output of the encryption cores will contain that many different encrypted values, a substantial amount of highly randomized output used as authorization code for the protection of the electronic design. The authorization codes are as secure as the encryption algorithm used to generate them.

The run time of the IP core can be limited and/or set by controlling the implementation and/or operation of one or both of the sequence generators. In some embodiments, the IP core sequence generator is modified by limiting the length of sequence that it can generate using a modulo function to limit the upper count or sequence limit of the configurable device sequence generator. That is, the secure device encryption core generates output having an encryption algorithm data width and the IP core sequence generator may be implemented as a counter that is modulo a smaller value than that encryption algorithm data width. In other embodiments, in an alternative IP core or secure device sequence generator, a maximum count limit can be used as part of a compare circuit to provide a more finely tunable stop value than a counter modulus. Moreover, the secure device sequence generator may be the controlled sequence generator, thus limiting the number of verifiable encrypted values (that is, clock cycles) coming from the secure device to the authorization logic in the protection circuit.

According to a method of the present invention for controlling use of an IP core, the IP core and the IP core protection circuit coupled to the IP core are implemented on a configurable device. The IP core protection circuit comprises a comparator coupled to the IP core and to an IP core authorization code generator, which contains the IP core sequence generator and IP core encryption core. The IP core sequence generator generates IP core sequence values which are encrypted using the IP core encryption core to generate the IP core encrypted sequence values. A secure device is coupled to the IP core protection circuit. A secure device authorization code generator is implemented on the secure device, the secure device authorization code generator having a secure device sequence generator and a secure device encryption core. Like the configurable device, the secure device generates secure device sequence values, encrypting the secure device sequence values using the secure device encryption core to generate secure device encrypted sequence values. The IP core encrypted sequence values and secure device encrypted sequence values are provided to the comparator. When the two sets of encrypted sequence values are not identical, the IP core and/or configurable device are prevented from operating.

Further details and advantages of the invention are provided in the following Detailed Description and the associated Figures.

BRIEF DESCRIPTION OF THE SEVERAL VIEWS OF THE DRAWINGS

The present invention will be readily understood by the following detailed description in conjunction with the accompanying drawings, wherein like reference numerals designate like structural elements, and in which:

FIG. 2 is a flow diagram of a method according to one embodiment of the present invention by which a sequence generator generates a long sequence of values that are encrypted and sent to an authorization logic of a protection circuit implemented in a configurable device in which is implemented an EP core or the like.

FIG. 3 is a flow diagram of a method according to the present invention in which the configurable device and the secure device generate authorization codes that are compared to control use of an IP core or the like.

DETAILED DESCRIPTION

The following detailed description will refer to one or more embodiments of the invention, but is not limited to such embodiments. The detailed description is intended only to be illustrative. Those skilled in the art will readily appreciate that the detailed description given herein with respect to the Figures is provided for explanatory purposes as the invention extends beyond these limited embodiments.

Embodiments of the present invention will be explained in connection with various specific devices, circuits, applications, etc. herein. However, these references are for purposes of illustration only and are not intended to limit the present invention in any way. For example, one or more embodiments of the present invention will be explained using programmable logic devices (PLDs) and technologies related thereto to illustrate the present invention. However, the invention is widely applicable to other devices and in other environments. Moreover, embodiments of the present invention may be used in a wide variety of functions and/or applications.

In this disclosure, a "configurable device" is a programmable device that ultimately contains user logic (that is, the function(s) programmed and implemented in a programmable device by a user, for example an electronic design). Typically, such a device has a volatile memory and must be programmed upon each power-up, though not every configurable device must possess these characteristics. Examples of configurable devices include SRAM PLDs and RAM-based PLDs (for example, Altera FLEX and STRATIX devices).

Moreover, in this disclosure, a "secure device" is defined to be a non-volatile programmable device, a custom logic device, a microprocessor or other similar device that is a secure device (that is, a device from which a design cannot be directly determined or read out of the device, such as an Altera MAX or MAX II device) and which installs user logic and possibly other functionalities into a configurable device (as defined above) from a configuration data memory (a "storage device"). As noted below, a storage device may be a component separate and distinct from a secure device or the two devices may be integrated to some degree in a single component. Where a storage device and a secure device are distinct, the two devices may be connected by a secure link to prevent copying of data transferred between the two devices.

The present invention provides techniques, methods and apparatus for controlling use of IP (for example, megafunctions) and thus assisting in protecting unauthorized use of such IP by securing operation of the IP in a configurable device using a secure device. In some embodiments of the present invention, the configurable device is an SRAM based PLD on which a megafunction and protection circuit are implemented. A secure device, such as a CPLD or an external processor coupled to the configurable device, provides a valid authorization code to the megafunction in the configurable device to allow use of the megafunction (for example, in connection with the user's design). The distribution and use of such megafunctions can be in a manner similar to Altera Corporation's OpenCore Plus and MegaCore programs. The present invention provides the additional benefit of providing higher security by the use of a secure device. Moreover, because an authorized secure device must be used to enable operation of a selected IP core, the number of instances of unlicensed IP cores can be limited by the IP owner.

In some embodiments of the present invention, the invention comprises an IP core coupled to a protection circuit. These two components may be provided to a user in a "package" so that only the protected IP core is subject to the protection (limiting effects) of the protection circuit. As will be appreciated by those skilled in the art, other embodiments of these two components can be generated and/or implemented in configurable devices and the like. In embodiments where the IP core and protection circuit are provided together, they may be encrypted, as is done with MEGACORE® software available from Altera Corporation. This compels a user to download, implement and use the IP core and protection circuit together.

Figure 1:
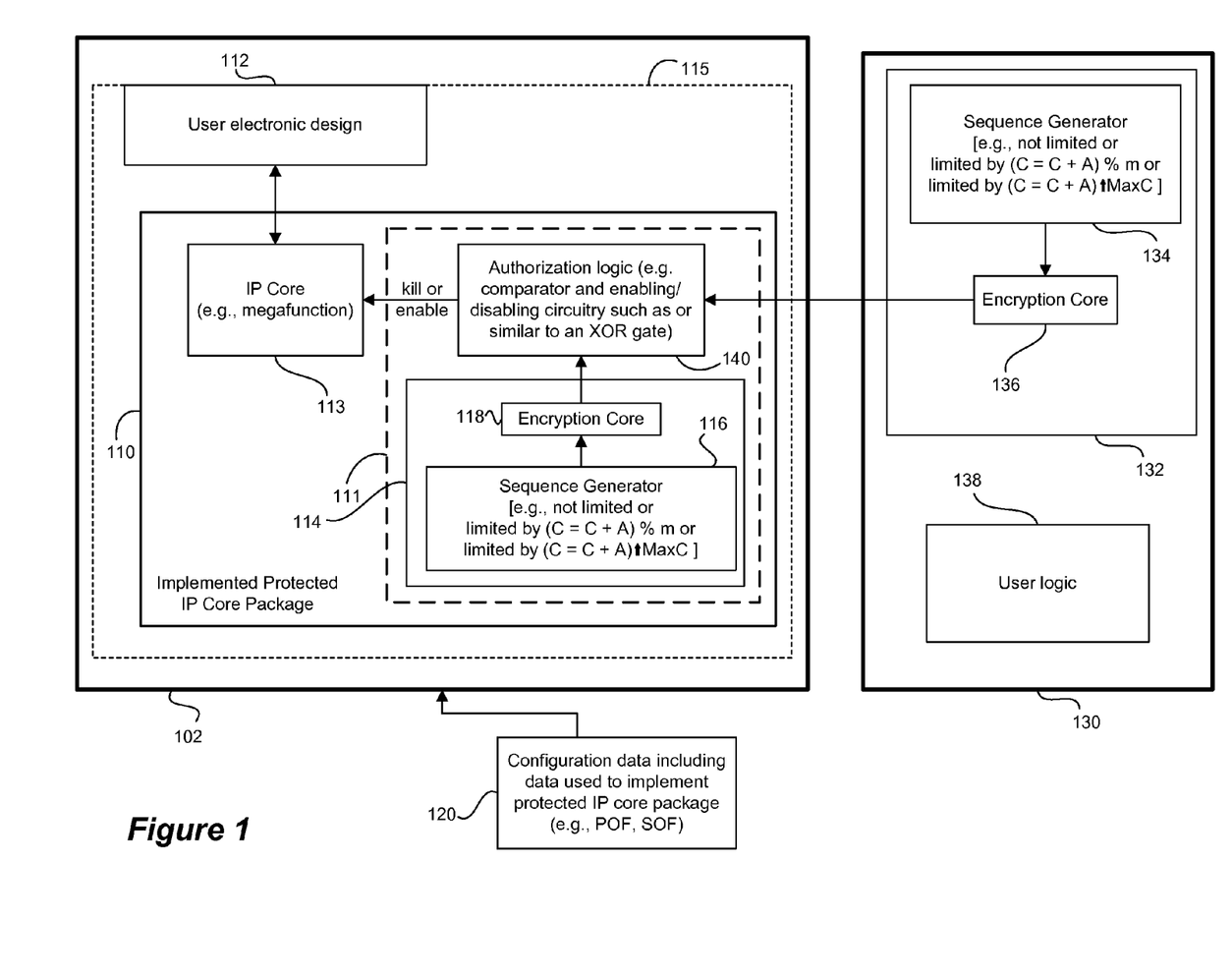
FIG. 1 is a schematic diagram of a system implementing one embodiment of the present invention using a secure device and a configurable device on which a protected IP core package is implemented.

FIG. 1 illustrates one embodiment of the present invention in which a configurable device 102 is to be programmed by configuration data 120. As mentioned above, examples of configurable devices include SRAM PLDs and RAM-based PLDs (for example, Altera FLEX devices, STRATIX devices, other look up table based devices and any other suitable devices known or apparent to those skilled in the art). Essentially, the present invention operates on the principle that both a secure device 130 and the configurable device 102 must implement and run identical protection circuits that produce identical authorization codes which, unlike prior codes, are difficult or impossible to reproduce in order to permit only limited use of IP (for example, a megafunction) 113 implemented on the configurable device 102 in connection with a user's electronic design 112. In some cases, as indicated by the dashed line 115 of FIG. 1, the megafunction may be integrated into the user's electronic design 112.

The configuration data 120 may be provided by any suitable source (for example, a ROM or computer system on which the configuration data is stored), as will be appreciated by those skilled in the art. In the case of Altera's MEGA-CORE® software and/or other products, the configuration data may be supplied by Altera or one of its AMPP partners as part of the Altera OpenCore Plus program. When embodiments of the present invention are used, the configuration data 120 may be openly readable, eliminating a costly and sometimes complicated step or function (for example, encryption of all of the configuration data) found in some earlier systems.

Data 120 is used to generate a protected IP package 110 which includes a protection circuit 111 and an IP core 113 implemented on the configurable device 102. By using the secure device 130, the IP owner can provide a limited number of the pre-programmed secure devices 130, thus allowing a user to use only as many instances of the protected IP core 113 as there are secure devices 130.

In the embodiment of the present invention shown in FIG. 1, circuit 111 includes an IP core authorization code generator 114. Authorization logic 140 for authorizing use of the IP core 113 is coupled to both the core 113 and the authorization code generator 114 and is used for verifying authorization codes to enable and/or disable the IP core 113 (and/or user electronic design 112). Authorization logic 140 may be a comparator (similar to an XOR function) or any other suitable device, structure or mechanism used for evaluating a plurality of input streams or signals coming from devices or structures coupled to means 140. The phrases "coupled to" and "connected to" and the like are used herein to describe a connection between two elements and/or components and are intended to mean coupled either directly together, or indirectly, for example via one or more intervening elements and, where possible, by wireless connection as well.

Because the IP core (and protection circuit) configuration data consists of a bitstream made of millions and millions of bits, it is impractical for a user to determine which bits create the protection circuit 111 (for example, the authorization code generator 114 and authorization logic 140) and how to subvert embodiments of the present invention using such a configuration. The IP core 113 may either be enabled or disabled initially after configuration, in which case the authorization logic 140 may include means for killing or enabling operation of the IP core 113, respectively.

In the embodiment of the present invention shown in FIG. 1, IP core authorization code generator 114 includes an IP core sequence generator 116 and an encryption core 118 coupled thereto. Sequence generator 116 can be any suitable generator of long sequences of numbers (for example, capable of long periods such as $2^{64}$ or something comparable). In some embodiments of the present invention, the full length of the sequences that can be generated will not be used, instead being set or selected to a smaller number, as explained in more detail below. Generator 116 might be and/or include a counter, a linear feedback shift register or any other pseudo random number generator meeting the need for long, non-repeating number sequences. The output numbers of the sequence generator 116 are provided to encryption core 118. Core 118 uses each number in the sequence generated as the seed or base for a different authorization code value. Thus, the output of core 118 is a sequence of values that are the output of the encryption algorithm used in core 118. If, for example, the period of the sequence generated by generator 116 is $2^{64}$, then the output of core 118 will contain that many different encrypted values, a substantial amount of highly randomized output used as authorization code for protection of the IP core 113. As noted below, additional steps may be taken to further reduce the chances of generating a "predictable" and/or "repeatable" sequence.

The IP core sequence generator 116 is modified by limiting the length of sequence that it can generate. In some embodiments of the present invention, a modulo function is used to limit the upper limit of the sequence generator 116. For example, where the sequence generator 116 is a counter that can generate a sequence with a period of $2^{64}$, the counter will be a modulo $2^m$ where m is smaller than the number of data bits of the encryption algorithm. That is, the secure device encryption core 136 generates output having an encryption algorithm data width and the IP core sequence generator 116 may be a counter that is modulo a smaller value than that encryption algorithm data width. Thus if m=32 and the counter period is $2^{64}$, the protection circuit 111 will provide a "valid" signal to the IP core 113 for $2^m$ clock cycles. Once that time has transpired, as described in more detail below, the protection circuit 111 will send a kill signal to the IP core 113. In embodiments of the present invention where the protected IP package 110 is provided via a limited license (for example, a license file when the protected IP package is downloaded), the number of count values (that is, how many cycles the IP core 113 will run before being disabled) can be controlled by the license file, which is needed to compile the IP core. The IP owner can change the number of cycles even after providing the IP core, and the change(s) will be implemented each time the protected IP package is compiled.

The modulo function described above (that is, having a counter in the IP core sequence generator 116 being of a lower modulus than a counter in the secure device sequence generator 134) is a very simple and efficient way of controlling the user's operation of the IP core 113. However, as will be appreciated by those skilled in the art, other limiting methods and means can be used. For example, as shown as an alternative IP core sequence generator 116 version in FIG. 1, a maximum count limit (for example, MaxC) can be used as part of a compare circuit in sequence generator 116 to provide a more finely tunable stop value than a modulus of a counter can be implemented in the IP core sequence generator 116. Moreover, the secure device sequence generator 134 may be the controlled sequence generator in the invention, thus limiting the number of verifiable encrypted values (that is, clock cycles) coming from the secure device 130 to the authorization logic 140.

The encryption algorithm used can be any appropriate encryption, depending on the security needs of the system. Some encryption algorithms that might be useful include DES, triple DES (3DES) and AES or any other encryption algorithms that can used in these types of applications. Others are known to those skilled in the art. Depending on the application and/or use of the system, strong encryption may be desirable, though it is not necessary in every embodiment of the present invention and environment in which the present invention might by used. In the embodiment shown in FIG. 1, the output of core 118 is the IP core authorization code.

As will be appreciated by those skilled in the art, additional steps may be performed before or after operation of core 118. For example, after the encryption algorithm of core 118 has finished running for a given sequence value, the authorization code generated may be further manipulated in any appropriate way. In the configuration of FIG. 1, no other steps are shown and authorization logic 140 can be a direct comparator. Whatever data is intended to be the IP core authorization code is transmitted to the comparator 140.

A secure device 130 also is provided in the illustrated system of FIG. 1. The secure device 130 typically is a CPLD such as a MAX or MAX II device manufactured and sold by Altera. In one embodiment of the present invention, the CPLD is a flash based CPLD utilizing a LUT based architecture, such as the Altera MAX II device. Such a device may be seen traditionally as an FPGA architecture not a CPLD. Other embodiments of the present invention may use an EEPROM CPLD like Altera's MAX device. Alternatively, an ASIC can be used as the secure device 130. The secure device 130 should be relatively secure from unauthorized copying or analysis. Devices that are programmed once and have this security attribute might include flash programmable devices and EEPROM programmable devices. Other devices may be suitable, as will be appreciated by those skilled in the art.

In the illustrative system of FIG. 1, secure device 130 includes a secure device authorization code generator 132 that is essentially identical to the configurable device's authorization code generator 114. Generator 132 includes a sequence generator 134 and encryption core 136 that are identical to the sequence generator 116 and core 118 found in the configurable device 102, except that the sequence generator 134 is not limited (as is the IP core sequence generator 116). If the sequence generator 134 is limited in some way, the sequence generated by the sequence generator 134 still has a longer period than the sequence generated by the sequence generator 116. This means that the outputs of generators 116 and 132 should be identical for number of clock cycles to which the sequence generator 116 is limited. Whenever the configurable device is powered up, it notifies the secure device to begin the authorization code generation process and to send the secure device's generated authorization code to the configurable device for verification.

As an example of operation of one embodiment of the present invention, when a counter is used as the sequence generator, the two sequence generators must start with the same seed value and use the same increment value. Similarly, if the sequence generators are LFSRs, the same start value must be used, too. Moreover, the cores 118, 136 must use the same key or be otherwise related so that their outputs are identical or can otherwise be compared to verify authorization to use the IP core 113. In some embodiments of the present invention, comparison of the IP core authorization code and secure device authorization code may simply be checking that they are identical. In other embodiments, additional manipulation and/or processing of the codes may be performed.

FIG. 1 represents a simple implementation of the present invention in which the encrypted data stream from the secure device 130 likely is sufficiently secure to protect against unauthorized use of the IP core 113. When using encryption in this way, as will be appreciated by those skilled in the art, several cycles may be required to generate, encrypt and compare the authorization codes. In such cases, the system must wait for the encryption algorithm to finish operating on the long sequence strings provided by sequence generators 116, 134.

One way to obtain the various identical values needed for the embodiment of the present invention shown in FIG. 1 is to take a user string (for example, "Good morning, Dr. Chandra") and hash the user string. From the hash string so generated, numbers can be taken to serve as initialization values, increment values, the encryption algorithm key, etc. as needed. The hashed information also can be used to select the output sequence of the encrypted bits, or even how many bits of the encrypted result are used. Just because a given number of output bits may be created (for example, 64), it is not necessary to use all of them (so long as operation of the IP core 113 can be suitably limited using the generated sequence). In some embodiments, a user may be allowed to choose a unique key for the encryption algorithm. In other embodiments, the IP core protection circuit 111 may generate a random number to initialize both the IP core and secure device authorization code generation circuits so that the initialization value(s), etc. are not the same each time. This can be done when the devices are powered up or can be done whenever the generators 116, 134 cycle through their long sequences.

Like its twin in the IP core protection circuit 111 in configurable device 102, the output of sequence generator 134 is coupled to an encryption core 136 that is identical to core 118. The output of core 136, which is the authorization code for the secure device 130, is transmitted to the authorization logic 140. The secure device 130 may also include user logic 138 and/or any other logic desired.

The IP core authorization code (that is, the output of the IP core authorization code generator 114) is transmitted to authorization logic 140. The authorization logic 140 is coupled to the IP core 113 or any other programmed logic to be protected against unauthorized use. As mentioned above, in FIG. 1, the authorization logic 140 can be a comparator configured to compare the bitstreams from the configurable device authorization code generator 114 and from the secure device authorization code generator 132. For example, the comparator 140 may be an XOR gate or other easily implementable comparator. The authorization logic 140 may include any other circuitry and/or control apparatus (for example, enabling and/or disabling circuitry) appropriate for performing the needed functions of the present invention. A comparator may be the authorization logic of the system and, as will be appreciated by those skilled in the art, other types of authorization logic can be used as appropriate. Such authorization logic can include means for comparing the authorization codes as well as enabling/disabling means for controlling operability of the IP core 113.

If the bitstreams do not match one another bit for bit, the IP core 113 is or remains disabled. This may be done by initially disabling the IP core 113 and only enabling after authorization code verification, or by initially enabling the IP core 113 and sending a kill signal from the authorization logic 140 if the authorization codes do not match. Specific methods and techniques for disabling a user's electronic design are not discussed in detail here, as those are well known to those skilled in the art.

Where the IP core sequence generator 116 is a binary counter, it can be modulo $2^m$, as noted above. Thus the sequences of the sequence generators 116, 134 will be identical for m clock cycles. After this time the counter 134 in the secure device 130 will no longer match the counter 116 in the configurable device 102, thus disabling the IP core 113. As will be appreciated by those skilled in the art, other techniques can be used to mismatch the counters 116, 134 after a selected period of time. For example, an IP core counter 116 can be disabled after 264 clock cycles, which is easily accomplished by using the inverse of the $m^m$ counter bit to enable flip flops in the counter 116. One advantage of the $2^m$ counter is its simplicity of implementation, using an m bit counter having the bits greater than the $m^{th}$ position of the encryption core set to 0. The length of time that the IP core is enabled thus compile time selectable (that is, controlled by the modulo value of the counter).

Figure 2:
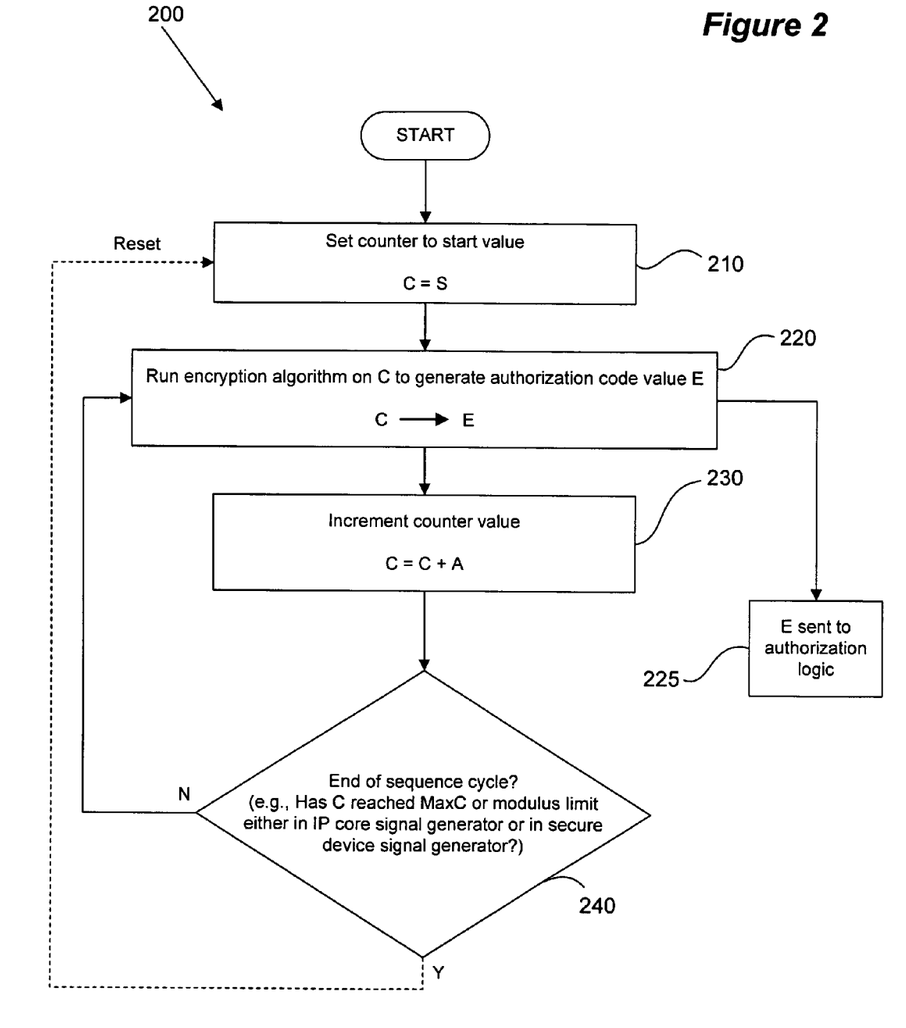

FIG. 2 illustrates one embodiment of the operation of a counter-based authorization code generator 200 usable with embodiments of the present invention. In the embodiment of the invention depicted in FIG. 2, the authorization code generator 200 can be in either the secure device or the configurable device, though the sequence generator in the configurable device may be implemented to run in a limited manner, as discussed in more detail above, to limit the operation time of an IP core implemented in the configurable device. In FIG. 2 the counter value C is initialized at 210 with a start value S. At step 220 the current counter value C is encrypted to generate an authorization code E, which is sent to the authorization logic at 225. The counter then increments the count value C by an increment value I at 230. In some embodiments, the increment value is a prime number. A decision 240 may then be made as to whether the sequence generator has reached the end of its sequence generation cycle. Where either the IP core sequence generator or the secure device sequence generator has been limited in its runtime (for example, by applying a modulo function to a counter or by imposing a MaxC stop value on a counter in one of the sequence generators), this decision may be reached at different points in the sequence generators, meaning that the authorization logic 140 will find a mismatch when one sequence generator begins generating values different than the other sequence generator. In the alternative, this decision may be optional, so that in its absence the process merely runs until it is ended. If the decision is used and the sequence has reached its end, then the process may stop or may reset itself, as indicated by the dashed line in FIG. 2. If not, the new value of C is then provided for encryption at step 220 and the process continues. Where the counter in the configurable device is limited as described above, the "end" of the sequence cycle may not be the end of the counter's period, but may instead be the imposed selectable value. Thus the term "end" at decision 240 is interpreted broadly enough to include the embodiments of the present invention disclosed and suggested herein.

Figure 3:
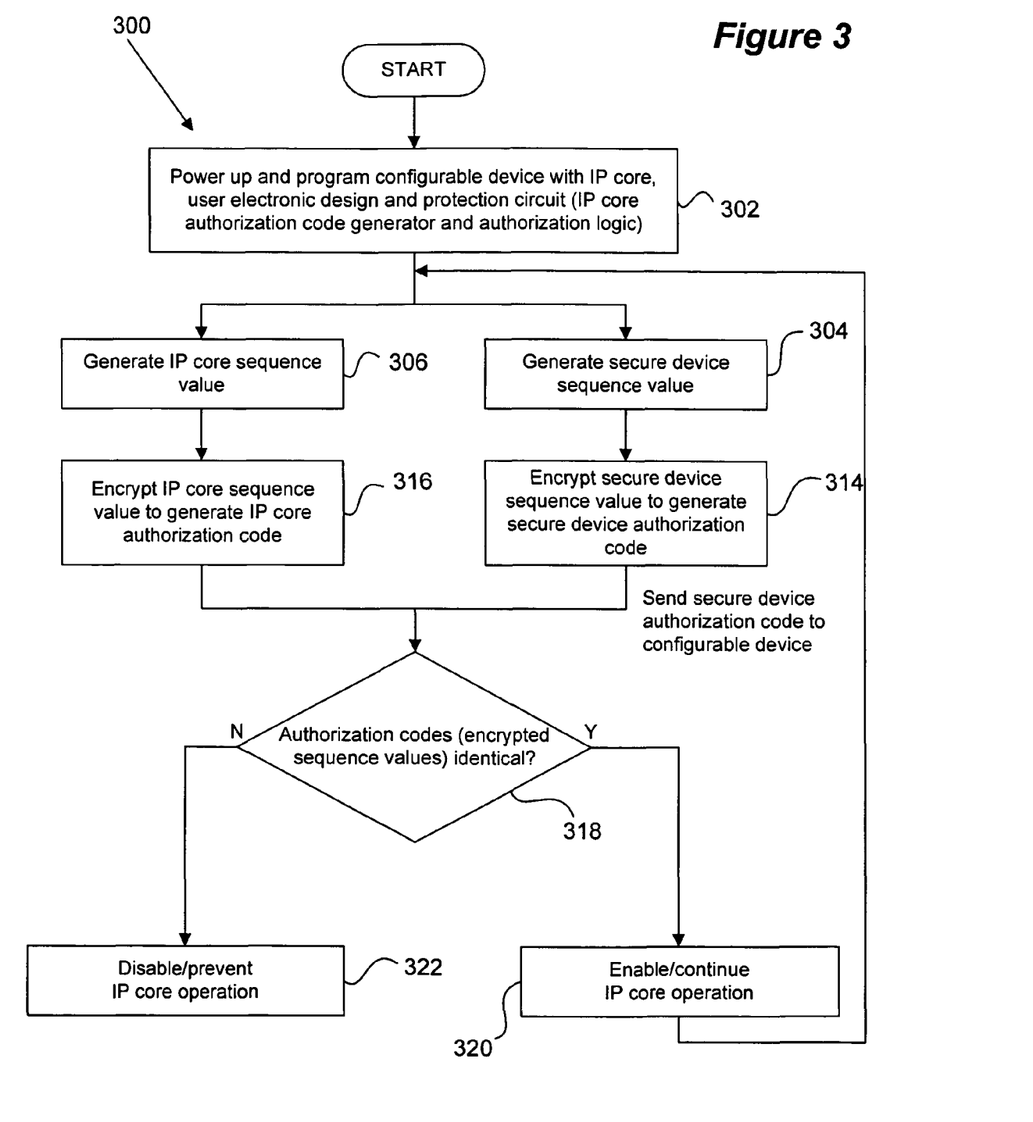

Another method according to one embodiment of the present invention is shown in FIG. 3. This method can be used in connection with the system of FIG. 1, for example, with some variations if desired, as will be appreciated by those skilled in the art. In this embodiment, the method 300 starts and the configurable device is powered up and configured with the IP core, any user electronic design and the protection circuit, which in this embodiment includes the IP core authorization code generator and a comparator at 302. The secure device and configurable device both have authorization code generators that begin authorization code generation at once in this embodiment. Each secure device sequence value is generated at 304. Thereafter, at 314, the secure device sequence value is encrypted to generate the secure device authorization code, after which the secure device authorization code is sent to the configurable device.

Each IP core sequence value is generated at 306 and is encrypted at 316 to generate the IP core authorization code. At decision 318, which may be performed by the authorization logic (for example, a comparator), the authorization codes (their encrypted sequence values) are compared by verifying that the authorization codes are identical on a bit-wise basis. If the codes are identical, then at 320 operation of the IP core is authorized and enabled (if disabled initially) or continued (if enabled initially). If, on the other hand, the authorization codes are not identical, then at 322 operation of the IP core is disabled (if enabled initially) or not allowed to start (if disabled initially).

Figure 4:
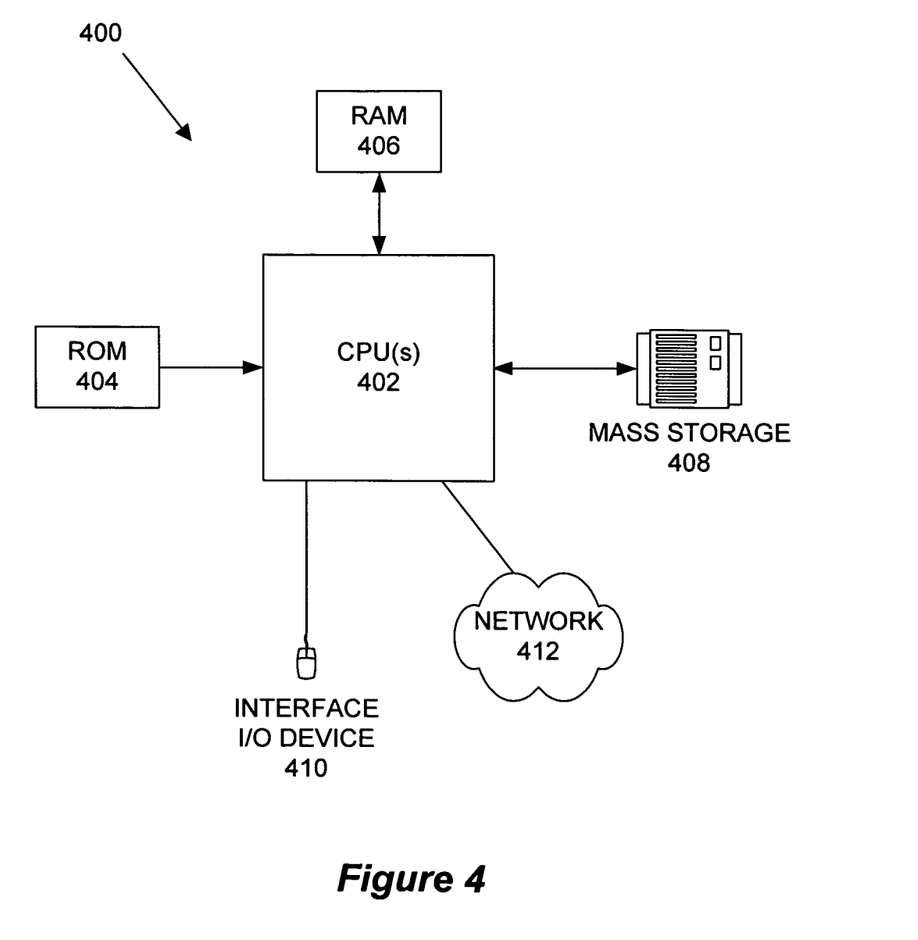
FIG. 4 is a block diagram of a typical computer system suitable for implementing an embodiment of the present invention.

FIG. 4 illustrates a typical computer system that can be used in connection with one or more embodiments of the present invention. The computer system 400 includes one or more processors 402 (also referred to as central processing units, or CPUs) that are coupled to storage devices including primary storage 406 (typically a random access memory, or RAM) and another primary storage 404 (typically a read only memory, or ROM). As is well known in the art, primary storage 404 acts to transfer data and instructions uni-directionally to the CPU and primary storage 406 is used typically to transfer data and instructions in a bi-directional manner. Both of these primary storage devices may include any suitable computer-readable media described above, including a computer program product comprising a machine readable medium on which is provided program instructions according to one or more embodiments of the present invention. A mass storage device 408 also is coupled bi-directionally to CPU 402 and provides additional data storage capacity and may include any of the computer-readable media described above, including a computer program product comprising a machine readable medium on which is provided program instructions according to one or more embodiments of the present invention. The mass storage device 408 may be used to store programs, data and the like and is typically a secondary storage medium such as a hard disk that is slower than primary storage. It will be appreciated that the information retained within the mass storage device 408, may, in appropriate cases, be incorporated in standard fashion as part of primary storage 406 as virtual memory. A specific mass storage device such as a CD-ROM may also pass data uni-directionally to the CPU.

CPU 402 also is coupled to an interface 410 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 402 optionally may be coupled to a computer or telecommunications network using a network connection as shown generally at 412. With such a network connection, it is contemplated that the CPU might receive information from the network, or might output information to the network in the course of performing the above-described method steps. The above-described devices and materials will be familiar to those of skill in the computer hardware and software arts.

The hardware elements described above may define multiple software modules for performing one or more steps and/or operations according to embodiments of the present invention. For example, instructions for running a power consumption estimation program, a design tool or any other appropriate program may be stored on mass storage device 408 or 404 and executed on CPU 402 in conjunction with primary memory 406. In synthesizing a design from a simulation version, a user may use a compiler to generate the design for implementation on hardware.

Figure 5:
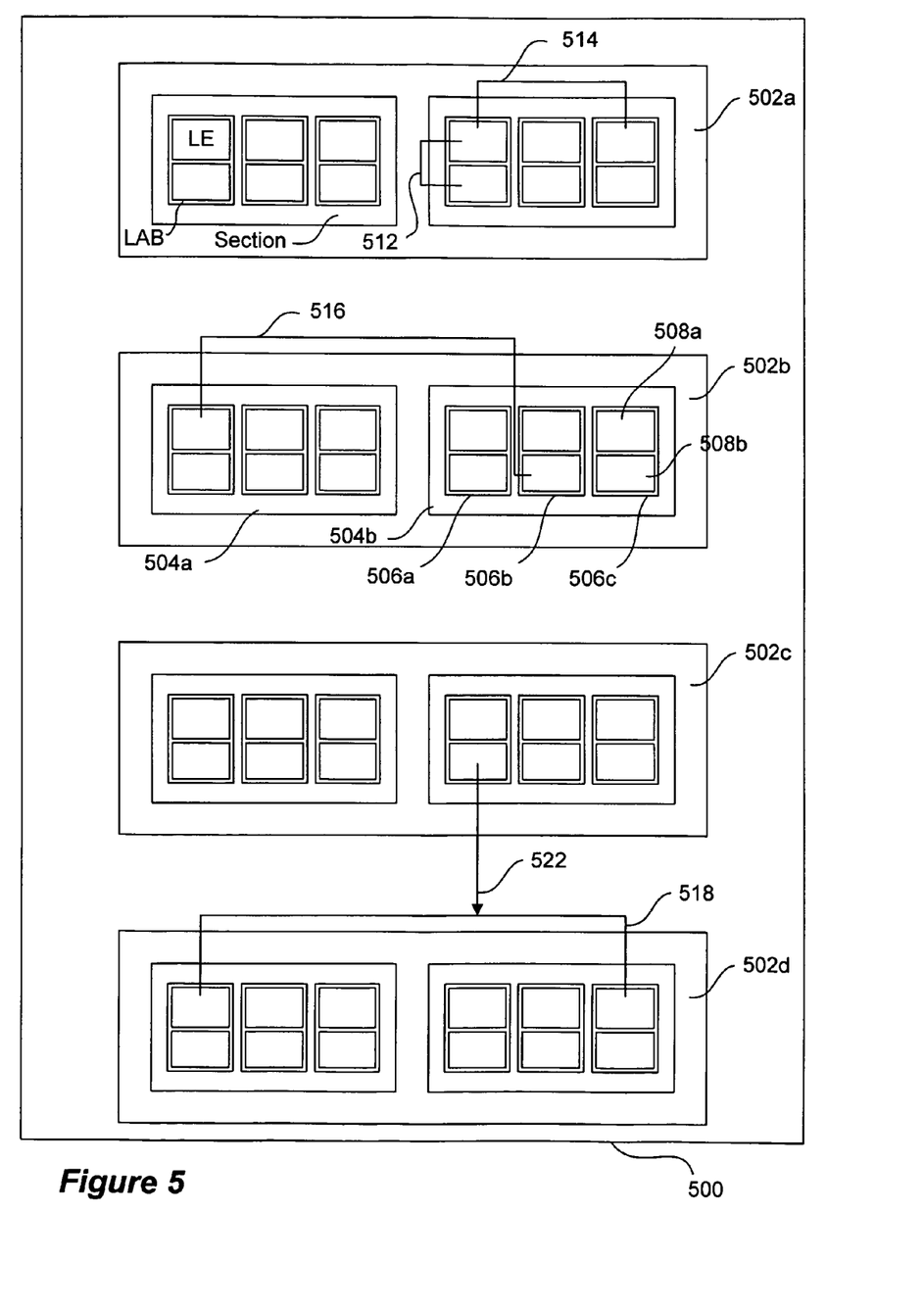
FIG. 5 is an idealized block representation of the architecture of an arbitrary hardware device, including interconnects, which may be employed in accordance with this invention.

The form of a compiled design according to one or more embodiments of the present invention may be further understood with reference to a hypothetical target hardware device having multiple hierarchical levels. Such a hardware device is represented in FIG. 5. This idealized representation roughly conforms to the layout of a FLEX 10K programmable logic device available from Altera Corporation of San Jose, Calif. In FIG. 5, a programmable logic device 500 is segmented into a plurality of "rows" to facilitate interconnection between logic elements on a given row. In the hypothetical example shown, there are four rows: 502a, 502b, 502c, and 502d.

Each row of programmable logic device 500 is further subdivided into two "half-rows." For example, row 502b is shown to contain a half-row 504a and a half-row 504b. The next lower level of the hierarchy is the "logic array block" (LAB). Half-row 504b, for example, contains three LABs: an LAB 506a, an LAB 506b, and an LAB 506c. Finally, at the base of the of the hierarchy are several logic elements. Each such logic element exists within a single logic array block. For example, LAB 506c includes two logic elements: a logic element 508a and a logic element 508b.

In short, PLD 500 includes four hierarchical levels: (1) rows, (2) half-rows, (3) LABs, and (4) logic elements (LEs). Any logic element within PLD 500 can be uniquely specified (and located) by specifying a value for each of these four levels of the containment hierarchy. For example, logic element 508b can be specified as follows: row (2), half-row (2), LAB (3), LE (2). To fit a logic design onto a target hardware device such as that shown in FIG. 5, a synthesized netlist is divided into logic cells (typically containing one or more gates) which are placed in the various logic elements as uniquely defined above. Thus, each logic cell from the synthesized netlist resides in a unique single logic element.

Often, a multi-level hardware hierarchy such as that shown in PLD 500 includes multiple levels of routing lines (interconnects). These connect the uniquely placed logic cells to complete circuits. In PLD 500, for example, four levels of interconnect are provided, one for each of the four hierarchy levels. First a local interconnect such as interconnect 512 is employed to connect two logic elements within the same LAB. At the next level, a LAB-to-LAB interconnect such as interconnect 514 is employed to connect two LABs within the same half-row. At the next higher level, a "global horizontal" interconnect is employed to connect logic elements lying in the same row but in different half-rows. An example of a global horizontal interconnect is interconnect 516 shown in row 502b. Another global horizontal interconnect is shown as interconnect 518, linking logic elements within row 502d. Finally, a "global vertical" interconnect is employed to link a logic element in one row with a logic element in a different row. For example, a global vertical interconnect 522 connects a logic element in the first LAB of the second half-row of row 502c to two separate logic elements in row 502d. In the embodiment shown, this is accomplished by providing global vertical interconnect 502 between the above-described logic element in row 502c to global horizontal interconnect 518 in row 502d. Consistent with the architecture of Altera Corporation's FLEX 10K CPLD, global vertical interconnects are directly coupled to the logic element transmitting a signal and indirectly coupled (through a global horizontal interconnect) to the logic elements receiving the transmitted signal.

In a target hardware device, there will be many paths available for routing a given signal line. During the routing stage, these various possible routing paths must be evaluated to determine which is best for the design being fit. The interconnect structure and overall architecture of the Altera FLEX 10K family of PLDs is described in much greater detail in U.S. Pat. No. 5,550,782, issued Aug. 27, 1996, naming Cliff et al. as inventors, and entitled "PROGRAMMABLE LOGIC ARRAY INTEGRATED CIRCUITS." That patent is incorporated herein by reference for all purposes. Additional discussion of the FLEX 10K and other PLD products may be found in other publications from Altera Corporation of San Jose, Calif.

Briefly, in the FLEX 10K architecture, there are at least three rows, with two half-rows per row, and twelve LABs per half-row. Each LAB includes eight logic elements each of which, in turn, includes a 4-input look-up table, a programmable flip-flop, and dedicated signal paths for carry and cascade functions. The eight logic elements in an LAB can be used to create medium-sized blocks of logic—such as 9-bit counters, address decoders, or state machines—or combined across LABs to create larger logic blocks.

It should be understood that the present invention is not limited to the Altera FLEX 10K architecture or any other hardware architecture for that matter. In fact, it is not even limited to programmable logic devices. It may be employed generically in target hardware devices as broadly defined above and preferably in application specific integrated circuit designs. PLDs are just one example of ICs that can benefit from application of the present invention.

Figure 6:
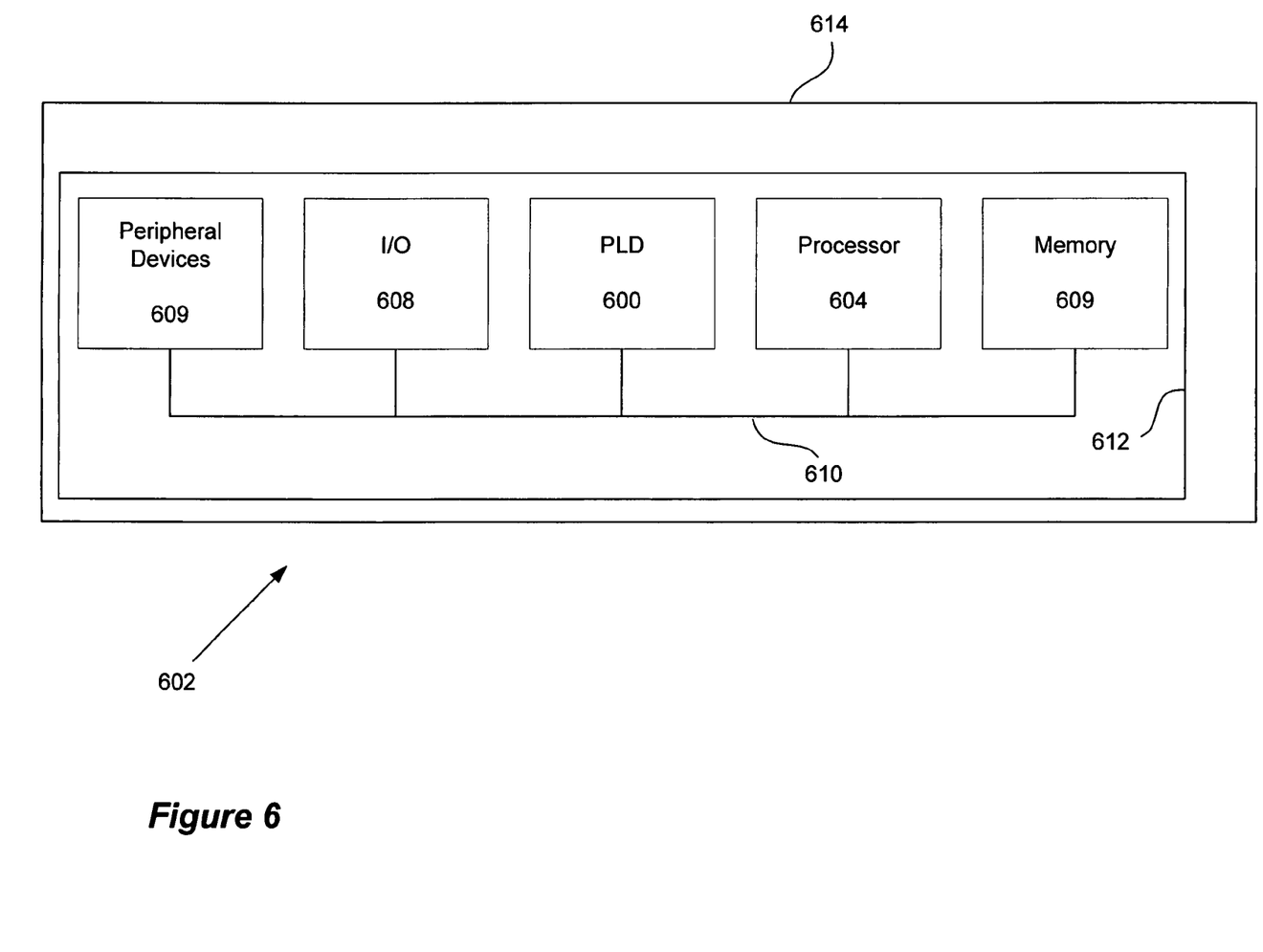
FIG. 6 is a block diagram depicting a system containing a PLD prepared in accordance with this invention.

This invention also relates to programmable logic and other devices programmed with a design prepared in accordance with the above described methods and/or using a computer program product according to one or more embodiments of the present invention. The invention further relates to systems employing such programmable logic devices. FIG. 6 illustrates a PLD 600 of the present invention in a data processing system 602. The data processing system 602 may include one or more of the following components: a processor 604; memory 606; I/O circuitry 608; and peripheral devices 609. These components are coupled together by a system bus 610 and are populated on a circuit board 612 which is contained in an end-user system 614.

The system 602 can be used in a wide variety of applications, such as computer networking, data networking, instrumentation, video processing, digital signal processing, or any other application where the advantage of using reprogrammable logic is desirable. The PLD 600 can be used to perform a variety of different logic functions.

The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation illustrated and described. Therefore, the described embodiments are illustrative and not restrictive, and the invention should not be limited to the details given herein but should be defined by the following claims and their full scope of equivalents, whether foreseeable or unforeseeable now or in the future.

What is claimed is:

1. A method comprising:
generating an intellectual property (IP) core sequence value using a configurable device, the configurable device configured with an IP core, the configurable device including a first sequence generator and a first encryption core;
encrypting the IP core sequence value to generate an IP core authorization code;
receiving a secure device authorization code from a secure device, the secure device including a second sequence generator corresponding to the first sequence generator and a second encryption core corresponding to the first encryption core, wherein the secure device authorization code comprises an encrypted secure device sequence value;
comparing the IP core authorization code with the secure device authorization code; and
preventing operation of the IP core configured on the configurable device in response to detecting a mismatch between the IP core authorization code and the secure device authorization code.

2. The method of claim 1, wherein:
the secure device is operable to install user logic into the configurable device from a storage device, the secure device comprising at least one of a non-volatile programmable device, a custom logic device, and a microprocessor; and
a design stored on said secure device cannot be directly determined or read out of the secure device.

3. The method of claim 1, further comprising receiving, at the configurable device, a plurality of secure device sequence values from the secure device, wherein the plurality of secure device sequence values is generated by encrypting a plurality of unencrypted secure device sequence values, wherein IP core operation is prevented when the IP core sequence value and the plurality of unencrypted secure device sequence values are generated for different time periods.

4. The method of claim 1, wherein said encrypting is performed using an encryption standard comprising DES, triple DES, or AES.

5. A non-transitory computer readable medium having instructions stored thereon that, if executed by a computing device, cause the computing device to perform operations comprising:
generating an intellectual property (IP) core sequence value using a configurable device, the configurable device configured with an IP core, the configurable device including a first sequence generator and a first encryption core;
encrypting the IP core sequence value to generate an IP core authorization code;
receiving a secure device authorization code from a secure device, the secure device including a second sequence generator corresponding to the first sequence generator and a second encryption core corresponding to the first encryption core, wherein the secure device authorization code comprises an encrypted secure device sequence value;
comparing the IP core authorization code with the secure device authorization code; and
preventing operation of the IP core configured on the configurable device in response to detecting a mismatch between the IP core authorization code and the secure device authorization code.

6. The non-transitory computer readable medium of claim 5, wherein:
the secure device is configured to install user logic into the configurable device from a storage device, the secure device comprising at least one of a non-volatile programmable device, a custom logic device, and a microprocessor; and
a design stored on said secured device cannot be directly determined or read out of the device.

7. The non-transitory computer readable medium of claim 5, wherein the operations further comprise receiving, at the configurable device, a plurality of secure device sequence values from the secure device, wherein the plurality of secure device sequence values is generated by encrypting a plurality of unencrypted secure device sequence values, wherein IP core operation is prevented when the IP core sequence value and the plurality of unencrypted secure device sequence values are generated for different time periods.

8. The non-transitory computer readable medium of claim 5, wherein said encrypting is performed using an encryption standard comprising DES, triple DES, or AES.

9. A system comprising:
 means for generating an intellectual property (IP) core sequence value using a configurable device, the configurable device configured with an IP core, the configurable device including a first sequence generator and a first encryption core;
 means for encrypting the IP core sequence value to generate an IP core authorization code;
 means for receiving a secure device authorization code from a secure device, the secure device including a second sequence generator corresponding to the first sequence generator and a second encryption core corresponding to the first encryption core, wherein the secure device authorization code comprises an encrypted secure device sequence value;
 means for comparing the IP core authorization code with the secure device authorization code; and
 means for preventing operation of the IP core configured on the configurable device in response to detecting a mismatch between the IP core authorization code and the secure device authorization code.

10. The system of claim 9, wherein:
 the secure device is operable to install user logic into the configurable device from a storage device, the secure device comprising at least one of a non-volatile programmable device, a custom logic device, and a microprocessor; and
 a design stored on said secure device cannot be directly determined or read out of the secure device.

11. The system of claim 9, wherein the means for receiving receives a plurality of secure device sequence values from a secure device, wherein the plurality of secure device sequence values is generated by encrypting a plurality of unencrypted secure device sequence values, wherein IP core operation is prevented when the IP core sequence value and the plurality of unencrypted secure device sequence values are generated for different periods of time.

12. A configurable device, configured with an IP core, comprising:
 a first sequence generator operable to generate an intellectual property (IP) core sequence value;
 a first encryption core coupled to the first sequence generator, the first encryption core operable to encrypt the IP core sequence value to generate an IP core authorization code;
 an interface operable to receive a secure device authorization code from a secure device, the secure device including a second sequence generator corresponding to the first sequence generator and a second encryption core corresponding to the first encryption core; and
 comparator logic operable to determine whether the IP core authorization code corresponds to the secure device authorization code, wherein operation of the IP core, configured on the configurable device, is prevented if the IP core authorization code does not correspond to the secure device authorization code.

13. The configurable device of claim 12, wherein output sequences of the first sequence generator and the second sequence generator are identical.

14. The configurable device of claim 13, wherein after a predetermined period of time, the output sequences of the first sequence generator and the second sequence generator will no longer be identical to prevent operation of the IP core.

15. The configurable device of claim 13, wherein the first sequence generator is disabled after a predetermined number of clock cycles.

16. The configurable device of claim 13, wherein the first sequence generator uses the same seed as the second sequence generator.

* * * * *